(12) United States Patent
Yamada

(10) Patent No.: US 9,611,890 B2
(45) Date of Patent: Apr. 4, 2017

(54) THRUST BEARING

(75) Inventor: Haruki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/111,973

(22) PCT Filed: Apr. 12, 2012

(86) PCT No.: PCT/JP2012/060018
§ 371 (c)(1),
(2), (4) Date: Nov. 25, 2013

(87) PCT Pub. No.: WO2012/141247
PCT Pub. Date: Oct. 18, 2012

(65) Prior Publication Data
US 2014/0072256 A1 Mar. 13, 2014

(30) Foreign Application Priority Data

Apr. 15, 2011 (JP) .................................. 2011-091112
Mar. 16, 2012 (JP) .................................. 2012-059950

(51) Int. Cl.
*F16C 33/58* (2006.01)
*F16C 19/30* (2006.01)
*F16C 43/04* (2006.01)

(52) U.S. Cl.
CPC .......... *F16C 33/586* (2013.01); *F16C 33/585* (2013.01); *F16C 19/305* (2013.01); *F16C 33/588* (2013.01); *F16C 43/04* (2013.01)

(58) Field of Classification Search
CPC .... F16C 33/585; F16C 33/586; F16C 33/588; F16C 19/305; F16C 33/58; F16C 33/583; F16C 33/4605; F16C 19/30; F16C 43/04
(Continued)

(56) References Cited

U.S. PATENT DOCUMENTS 4,042,285 A * 8/1977 Dorsch ......................... 384/621
4,883,374 A * 11/1989 Rhoads et al. ................ 384/618
(Continued)

FOREIGN PATENT DOCUMENTS

| JP | 2003-83339 | 3/2003 |
|---|---|---|
| JP | 2007-247878 | 9/2007 |
| JP | 2008-39031 | 2/2008 |

OTHER PUBLICATIONS

International Preliminary Report on Patentability and Written Opinion of the International Searching Authority issued Oct. 24, 2013 in International (PCT) Application No. PCT/JP2012/060018.
(Continued)

*Primary Examiner* — Alan B Waits
(74) *Attorney, Agent, or Firm* — Wenderoth, Lind & Ponack, L.L.P.

(57) ABSTRACT

The invention is for an outer ring which has a flange formed with engaging hooks for assembly with a retainer. An object is to prevent the outer ring from catching each another in manufacturing steps. A thrust bearing includes an outer ring which has a flange provided with radially inward-protruding engaging hooks. Each engaging hook has an amount of protrusion which is not greater than a height of the flange tip edge of a hypothetical outer ring. This arrangement prevents any of the engaging hooks of the outer ring from being caught by the flange of another outer ring.

12 Claims, 17 Drawing Sheets

(58) Field of Classification Search
USPC .................................. 384/618, 621, 622, 623
See application file for complete search history.

(56) References Cited

U.S. PATENT DOCUMENTS

| | | | |
|---|---|---|---|
| 5,114,249 A * | 5/1992 | Muntnich et al. ............. | 384/622 |
| 5,335,998 A * | 8/1994 | Muntnich et al. ............. | 384/622 |
| 7,104,699 B2 * | 9/2006 | Shattuck et al. ............... | 384/621 |
| 8,448,430 B2 * | 5/2013 | Fukami et al. ................. | 60/361 |
| 2003/0165281 A1 * | 9/2003 | Fujioka et al. ............... | 384/618 |
| 2010/0058750 A1 * | 3/2010 | Fukami et al. ................. | 60/330 |
| 2010/0247020 A1 | 9/2010 | Fukami | |
| 2013/0301974 A1 * | 11/2013 | Yamada et al. ............... | 384/621 |
| 2014/0147071 A1 * | 5/2014 | Takemura et al. ............ | 384/621 |

OTHER PUBLICATIONS

International Search Report issued May 15, 2012 in International (PCT) Application No. PCT/JP2012/060018.
Supplementary European Search Report issued Oct. 1, 2014 in corresponding European Patent Application No. 12771075.4.

* cited by examiner

THRUST BEARING

TECHNICAL FIELD

The present invention relates to thrust bearings, and more specifically to a thrust bearing in which bearing rings and a retainer are non-separatingly assembled together.

BACKGROUND ART

There is known a thrust bearing in which the outer ring and the retainer are non-separatingly assembled for easy installation to a housing or a shaft. In this case, for fastening the outer ring and the retainer to each other, the outer ring has its flange tip region formed with protruding tabs, and these tabs are bent over the track surface so as to serve as engaging hooks (Patent Literature 1). FIG. 29 through FIG. 32 show an example of outer ring 1 used in such a thrust bearing as described above.

The outer ring 1 has its outer circumferential edge provided with a flange 2, and the flange 2 is formed with rectangular tubs at a plurality of locations in its circumferential direction. These tubs are bent inward over a rolling contact surface 3, to serve as engaging hooks 4.

CITATION LIST

Patent Literature

[Patent Literature 1] JP-A-2003-83339

SUMMARY OF INVENTION

Technical Problem

A problem, however, lies when a large number of the outer rings 1 are being handled in a mass manufacturing process (such as in a transporting, an assembling, or a polishing processes). Specifically, an engaging hook 4 of an outer ring 1 catches an engaging hook 4a of another outer ring 1a of the same construction as shown in FIG. 31, resulting in entanglement which greatly lowers operability.

The engaging hook 4 can also catch a flange 2a of another outer ring 1a as shown in FIG. 32.

The present invention makes it an object to provide a thrust bearing which includes an outer ring that does not catch an engaging hook or a flange in an outer ring of another thrust bearing of the same construction even when a large number of the thrust bearings are being handled at one time.

Solution to Problem

In order to achieve the object stated above, the present invention provides a thrust bearing which includes an assembly structure of: an outer ring having an outer diameter edge formed with a flange; and a retainer holding a predetermined number of rollers. The flange has a tip edge formed with engaging hooks protruding radially inward, and the engaging hooks fasten the outer ring and the retainer to each other in a non-separating manner. With the above, there is a radial gap $\delta$ or an axial gap $\phi$ not smaller than zero between the engaging hook in the outer ring and the flange of a hypothetical outer ring of the identical construction when these two outer rings are in a marginal engagement state which is a state where the two outer rings are arranged in such a manner that: an axis of the outer ring and an axis of the hypothetical outer ring are perpendicular to each other; an axis of the hypothetical outer ring is in parallel to a predetermined base line of the outer ring; the outer ring has its surface formed with the flange being faced upward; the hypothetical outer ring is placed thereon, with its surface formed with the flange facing the base line; and the engaging hook engages with the flange in the other outer ring, or the flanges in the two outer rings engage with each other, at two points.

Herein, the term "marginal engagement state" refers to a state of engagement between the flange or the engaging hook, or between the flanges, in the outer ring and the engaging hook where the two parts in the engagement are at the closest positions to each other. Unless the marginal engagement state is reached, there is no chance for the engaging hook of the outer ring to be caught by the flange of the hypothetical outer ring, and therefore, there is no chance for entanglement. On the contrary, once the marginal engagement state is passed, the outer ring and the hypothetical outer ring are separated from each other, so there is no chance for entanglement in this case, either.

Since the marginal engagement state is the state where the engaging hook of the outer ring and the flange of the hypothetical outer ring are closest to each other, this is the state where entanglement is most likely to occur. However, if there is a radial gap $\delta$ or an axial gap $\phi$ between the engaging hook of the outer ring and the flange of the hypothetical outer ring, and the gap is not smaller than zero, then, the engaging hook and the flange are not caught by each other since they are separated from each other by the gap $\delta$ or by the gap $\phi$ and not in actual engagement.

It should be noted here that the flange may have an axial height H2 which exceeds an axial inside height H3 of the engaging hook (H2>H3). When this condition is satisfied, one engaging hook will not catch an engaging hook in another outer ring; namely, entanglement between engaging hooks is prevented.

Advantageous Effects of Invention

As described, the present invention prevents bearing rings from becoming entangled with each other in manufacturing processes of the bearing rings. Therefore, the invention makes it easy to move or carry the bearing rings as a product. The invention also improves operability in later steps such as polishing.

DESCRIPTION OF EMBODIMENTS

Hereinafter, embodiments of the present invention will be described based on the attached drawings.

Embodiment 1

Figure 1:
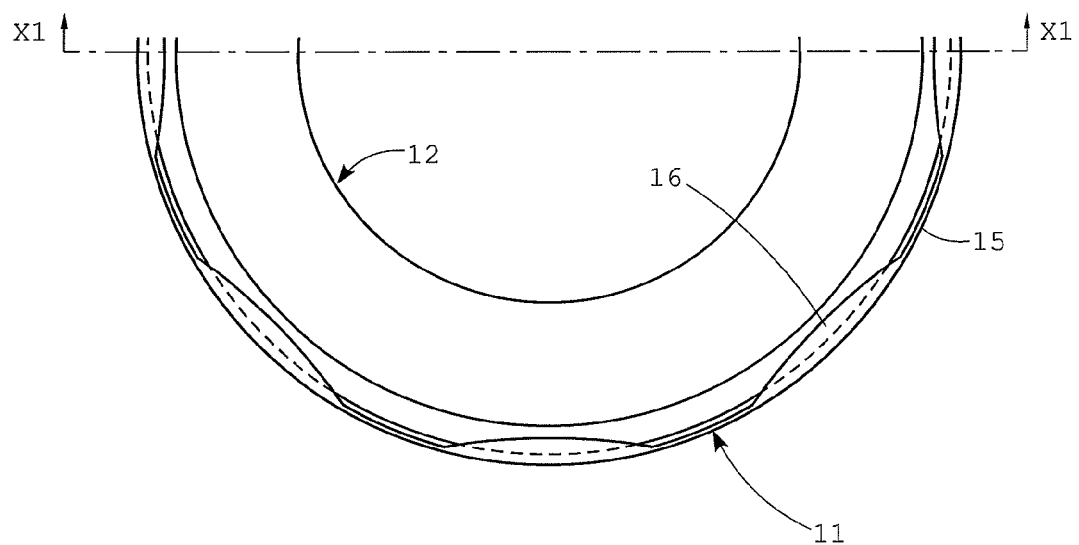
FIG. 1 is a partially unillustrated plan view of a thrust bearing according to Embodiment 1.
Figure 2:
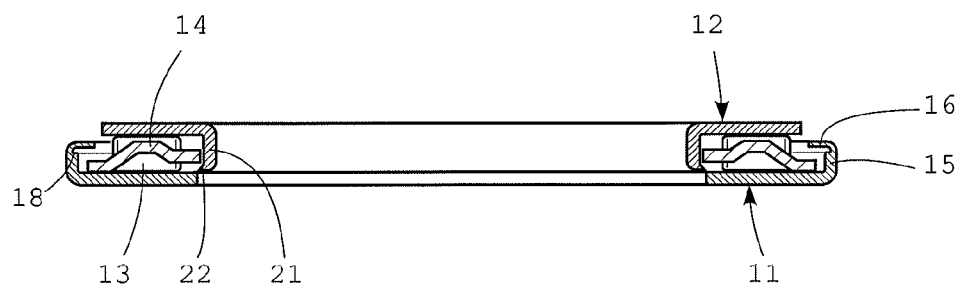
FIG. 2 is a sectional view taken in line X1-X1 in FIG. 1.

As shown in FIG. 1 and FIG. 2, a thrust bearing according to Embodiment 1 includes an outer ring 11, an inner ring 12, a predetermined number of rollers 13 between these two members, and a retainer 14 which holds these rollers 13 at a constant interval. The outer ring 11 has a flange 15 formed with engaging hook 16 whereas the inner ring 12 has an radially inner flange 21 formed with engaging hooks 22, and each engaging hook makes engagement with an outer circumferential edge or an inner circumferential edge of the retainer 14. Thus, these three components, i.e., the outer ring 11, the inner ring 12 and the retainer 14 provides a structurally non-separating assembly.

Figure 3:
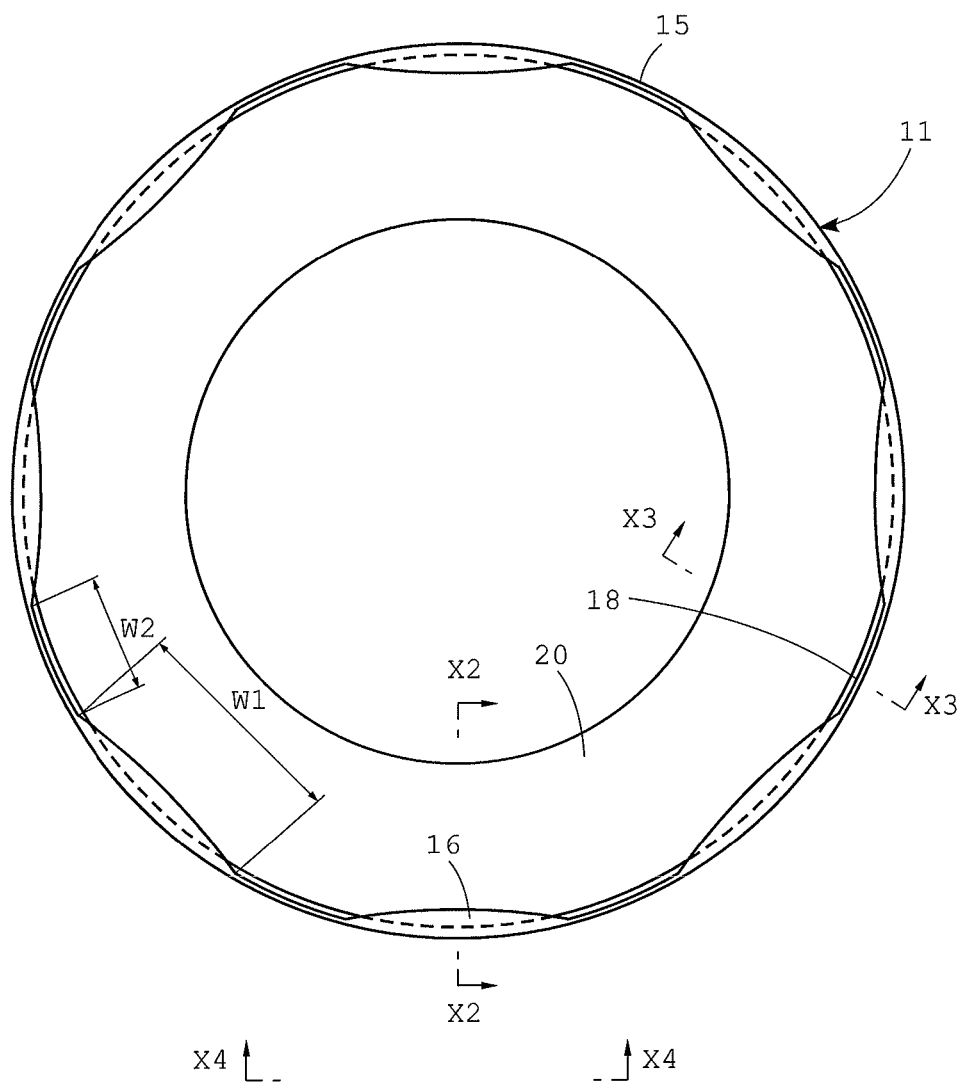
FIG. 3 is a plan view of an outer ring.
Figure 4:
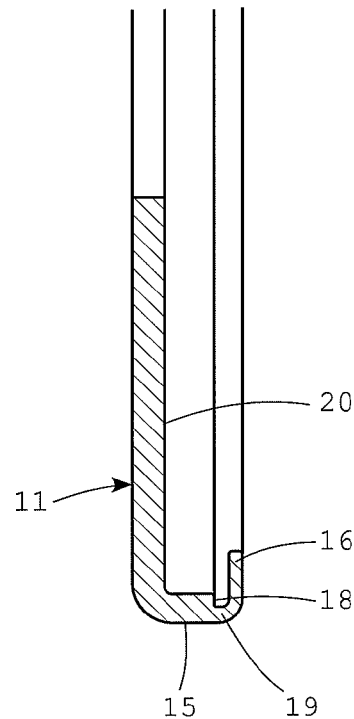
FIG. 4 is a sectional view taken in line X2-X2 in FIG. 3.
Figure 5:
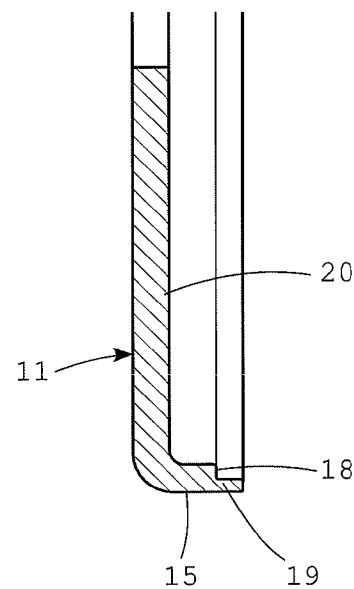
FIG. 5 is a sectional view taken in line X3-X3 in FIG. 3.

The engaging hooks 16 in the outer ring 11 are formed equidistantly, i.e., intermittently, in a circumferential direction on a tip edge of the flange 15, at several locations (eight locations in the figure), with each of the hooks protruding radially inward. As shown in FIG. 3 through FIG. 5, the flange 15 has its tip edge region formed with a step 18 on its inner diameter surface. The flange 15 refers to a portion to a tip edge region 19 (see FIG. 4 and FIG. 5) which is made thinner by the step 18. The tip edge region 19 is formed with arc-shaped protrusions at intermittent locations in a circumferential direction. Each of these protrusions is bent to provide the above-mentioned engaging hook 16.

As shown in FIG. 3, the engaging hook 16 protrudes like an arc, with a maximum protrusion in an intermediate portion, with gradually decreasing protrusion toward the ends, and zero protrusion at each end of the arc. With a total length of the engaging hook 16 being represented by W1, and a distance between two mutually adjacent engaging hooks 16 being represented by W2, a relationship between the two in the embodiment in the figures is expressed as W1>W2. However, there may be other cases, such as W1<W2; W2 equals 0; and W is close to 0.

Figure 6:
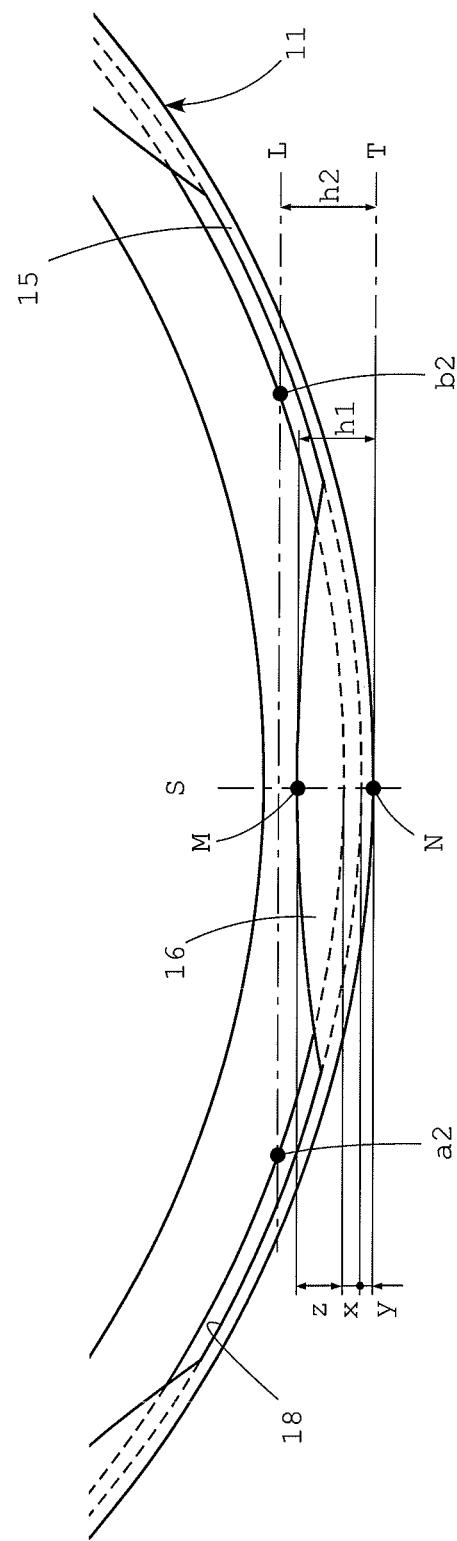
FIG. 6 is an enlarged plan view of a portion in FIG. 1.

FIG. 6 shows how to define a radially inward protruding height h1 of the engaging hook 16. Specifically, the engaging hook 16 has its inner side halved by a midpoint M. A radial line S which passes M (and therefore passes the maximum protrusion point in the engaging hook 16) crosses an outer circumferential circle of the flange 15 at an intersection N. A tangential line drawn to pass the intersection N will serve as a base line T. A height of the engaging hook 16 from the base line T is the protruding height h1. The protruding height h1 is a sum of a predetermined bearing gap x, a thickness y of the flange 15 and an engaging margin z, i.e., h1=x+y+z. This engaging margin z prevents the retainer 14 from coming off.

In order to prevent the outer ring 11 from catching an outer ring 11 of the same construction during manufacturing steps, the protruding height h1 of the engaging hook 16 is as shown in FIG. 6; namely, not exceeding a tip of a flange 15a of a hypothetical outer ring 11a (see FIG. 7) as will be described later. The tip (indicated by an engagement line L) of the outer ring 11a is at a height h2 from the base line T. In other words, there is a relationship expressed as h1≤h2 (hereinafter called first catch-free condition).

Hereinafter, the above-defined first catch-free condition will be described in terms of a relationship between the length W1 of the engaging hook 16 and the length W2 which is a distance between two mutually adjacent engaging hooks 16, for possible cases.

First, description will cover a case where W1<W2. Now, with reference to FIG. 7 and FIG. 8, it should be noted here that an outer ring 11 will be differentiated from another outer ring 11a of the same construction (Hereinafter, said another will be called hypothetical outer ring 11a for easy clarification from the first outer ring 11. All parts in the hypothetical outer ring 11a will be indicated in a similar manner, with an affix "a" following the original reference symbol of the outer ring 11). First, an outer ring 11 is placed so that its flange 15 faces upward, and thereon a hypothetical outer ring 11a is placed so that their axial centerlines are perpendicular to each other and a surface including the flange 15a is faced toward the base line T. Next, while maintaining the above-described attitude relationship, the hypothetical outer ring 11a is translated, or shifted (see white Arrow A in FIG. 7 and FIG. 8), in parallel to the base line T (see FIG. 6).

Figure 7:
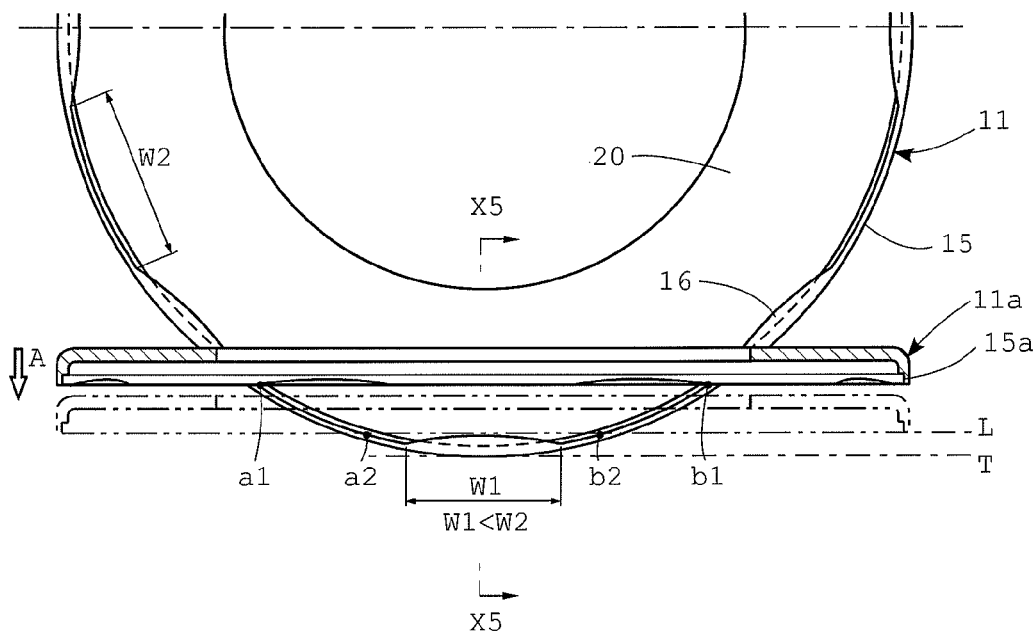
FIG. 7 is a partial plan view of an outer ring combined with a transverse view of another, for describing how the outer rings will catch each other.
Figure 8:
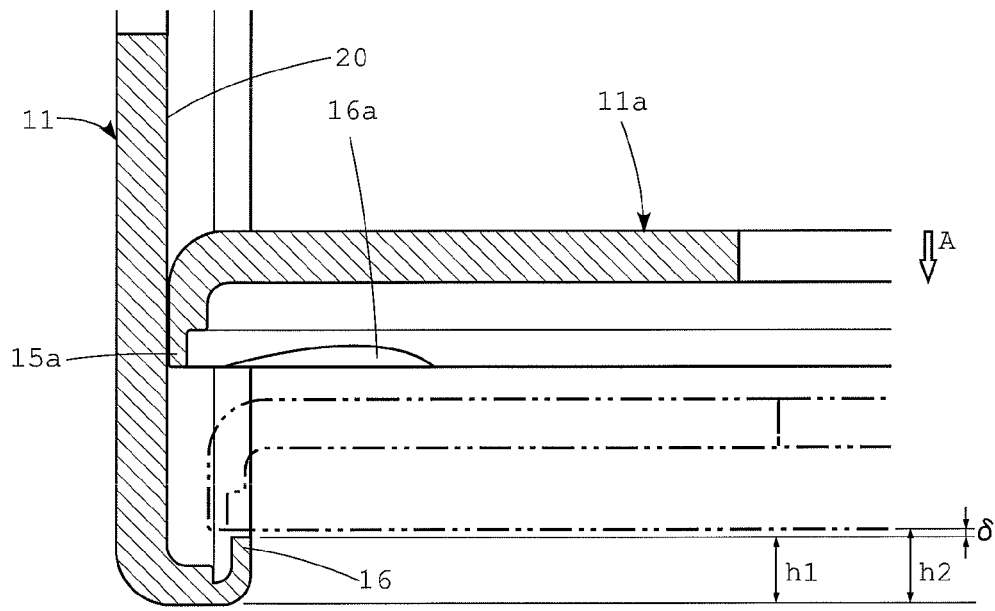
FIG. 8 is an enlarged sectional view taken in line X5-X5 in FIG. 7.

In this movement, if the outer circumferential surface of the hypothetical outer ring 11a is translated radially while making contact with the rolling contact surface 20 of the outer ring 11, the flange 15a of the hypothetical outer ring 11a makes engagement with the flange 15 of the outer ring 11 at two points, a1 and b1 (as illustrated in solid lines in FIG. 7 and FIG. 8). However, if the hypothetical outer ring 11a is moved away from the rolling contact surface 20, the engagement is broken and it becomes possible to continue the radial translation further.

Thus, when the flange 15a of the hypothetical outer ring 11a comes closer, radially to the engaging hook 16 of the outer ring 11, a limiting point is eventually reached where any further movement to come closer will cause the flange 15a to make contact with or to ride over an end surface of the engaging hook 16, breaking the engagement state into non-engagement state. The hypothetical outer ring 11a in this state is shown in alternate long and two short dashes lines in FIG. 7 and FIG. 8, with the two points of engagement indicated by reference symbols a2 and b2. The state of engagement at the limiting point as described above will be called marginal engagement state. At a marginal engagement state, the outer ring 11 and the hypothetical outer ring 11a are most likely to catch each other.

Once the marginal engagement state is passed, the hypothetical outer ring 11a is separated from the outer ring 11 and the two outer rings can no longer catch each other. Therefore, whether or not these two outer rings will catch each other must be determined by examining the marginal engagement state.

In the marginal engagement state described above, there is further defined an engagement line L (see FIG. 6 and FIG. 7) which connects the two points a2 and b2. This engagement line L corresponds to the upper end edge of the flange 15a. A height h2 of the engagement line L from the base line T is defined as the height of the engagement line L.

As shown in FIG. 7 and FIG. 8, in cases where the protruding height h1 of the engaging hook 16 is equal to or smaller than the height 2 of the engagement line L (h1≤h2), the engaging hook 16 cannot reach the flange 15a of the hypothetical outer ring 11a (i.e. of another outer ring 11 of the same construction, in actual situations), and therefore, there can no longer be a case where they catch each other. This relationship, h1≤h2, will be called first catch-free condition. The relationship which is expressed as h1≤h2 means that a radial gap δ (see FIG. 8) between the engaging hook 16 in the outer ring 11 and the upper end edge of the flange 15a of the hypothetical outer ring 11a is zero or greater than zero.

In short, the engaging hook 16 and the flange 15a cannot engage with each other when they are in radial abutment with each other (when the gap has a value of zero) or when they are in radial separation from each other (when the gap has a finite value), and therefore there is no possibility for them to catch each other.

Figure 9:
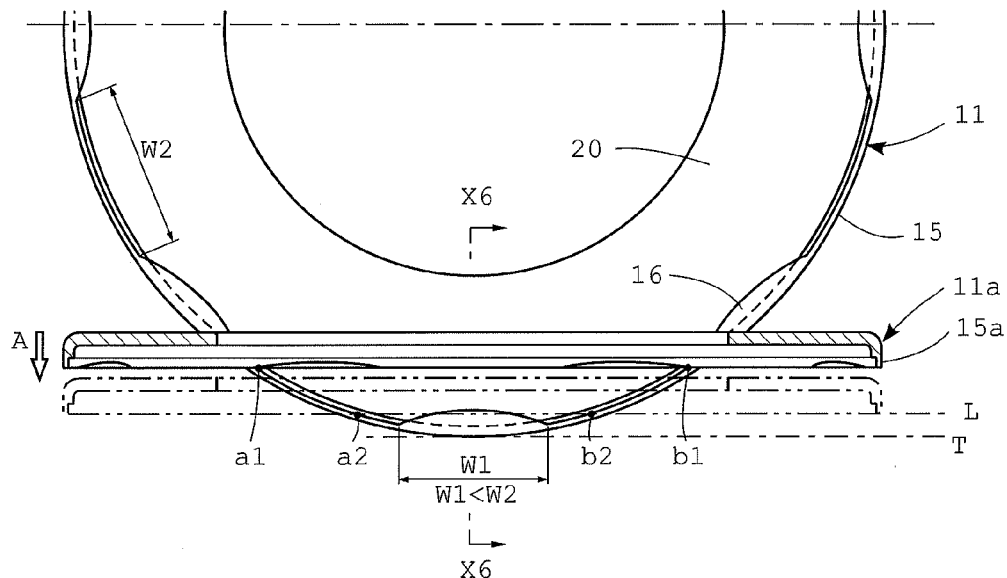
FIG. 9 is a partial plan view of an outer ring combined with a transverse view of another, for describing another example of how the outer rings will catch each other.
Figure 10:
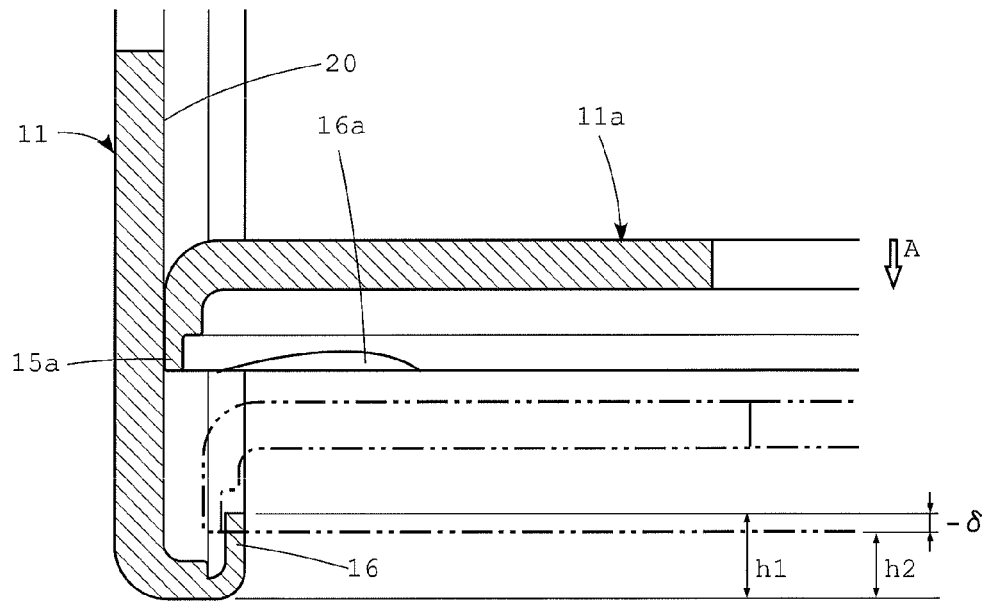
FIG. 10 is an enlarged sectional view of a portion taken in line X6-X6 in FIG. 9.

If the relationship is h1>h2, as shown in FIG. 9 and FIG. 10, the engaging hook 16 and the flange 15a overlap each other in the marginal engagement state, resulting in a situation where the radial gap δ is negative (−δ), which means that they are in engagement with each other and therefore apt to catch each other.

It should be noted here that the first catch-free condition relates to the protruding height h1 of the engaging hook 16 but does not directly relate to the shape of protrusion. However, in consideration of such risks as the protrusion can be chipped, or in order to ensure that the flanges will disengage easily from each other even in a very rare case in which they catch each other, the shape of protrusion of the engaging hook 16 is desirably an arc as shown in the figures.

Figure 11:
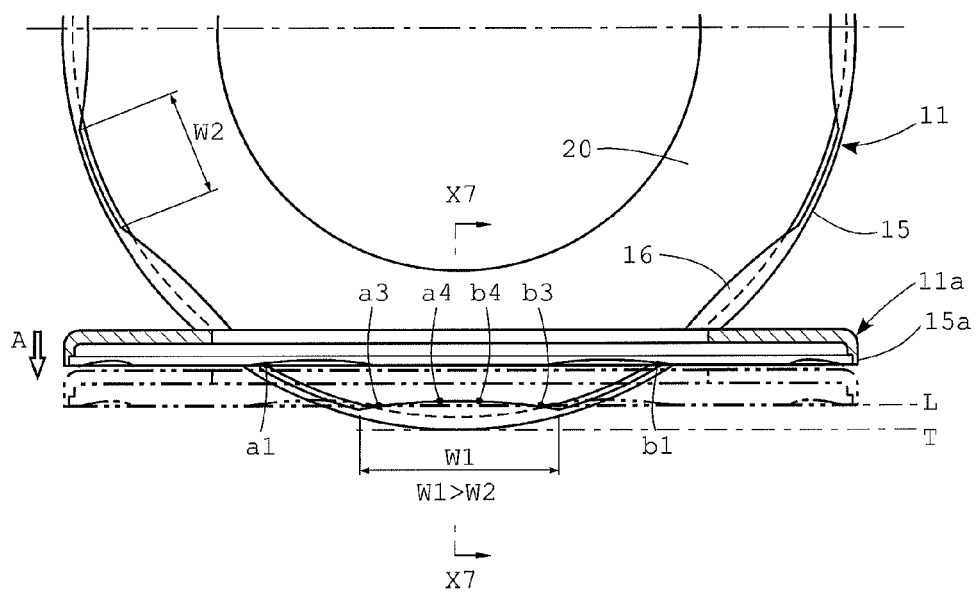
FIG. 11 is a plan view of an outer ring combined with a transverse view of another, for describing another example of how the outer rings will catch each other.
Figure 12:
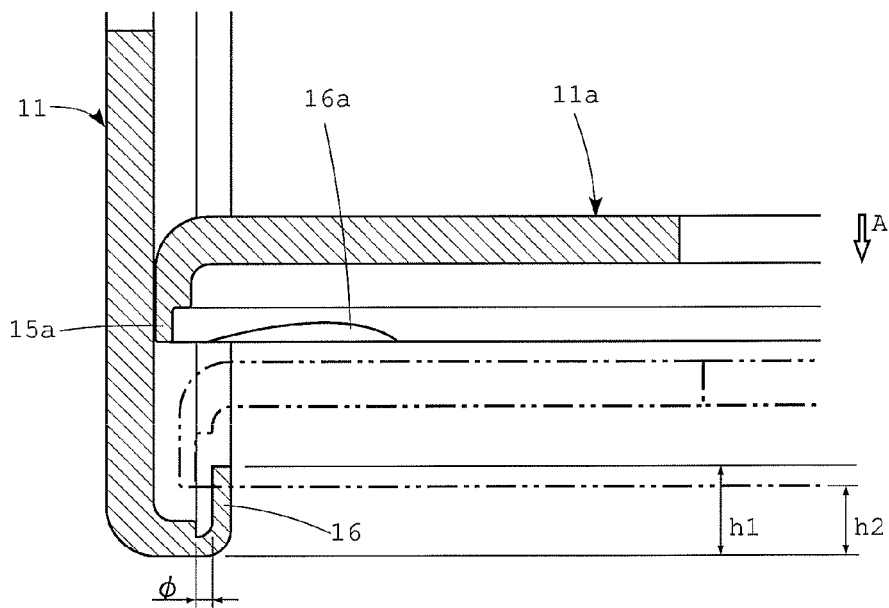
FIG. 12 is an enlarged sectional view of a portion taken in line X7-X7 in FIG. 11.

Next, description will cover a case where W1>W2, with reference to FIG. 11 through FIG. 14. As shown in FIG. 11 and FIG. 12, the outer ring 11 and the hypothetical outer ring 11a are arranged in the same manner as before, and then the hypothetical outer ring 11a is translated in parallel to the base line T as was done in the previous description (see white arrow A in FIG. 11 and FIG. 12).

In this movement, if the outer circumferential surface of the hypothetical outer ring 11a is translated while making contact with the rolling contact surface 20 of the outer ring 11, the flange 15a of the hypothetical outer ring 11a makes engagement with the flange 15 of the outer ring 11 at certain points, i.e., at two points a1 and b1 (see the hypothetical outer ring 11a illustrated in solid lines in FIG. 11 and FIG. 12). If the translation of the hypothetical outer ring 11a is to be continued further, the outer circumferential surface of the hypothetical outer ring 11a must be moved away from the rolling contact surface 20 of the outer ring 11.

Figure 13:
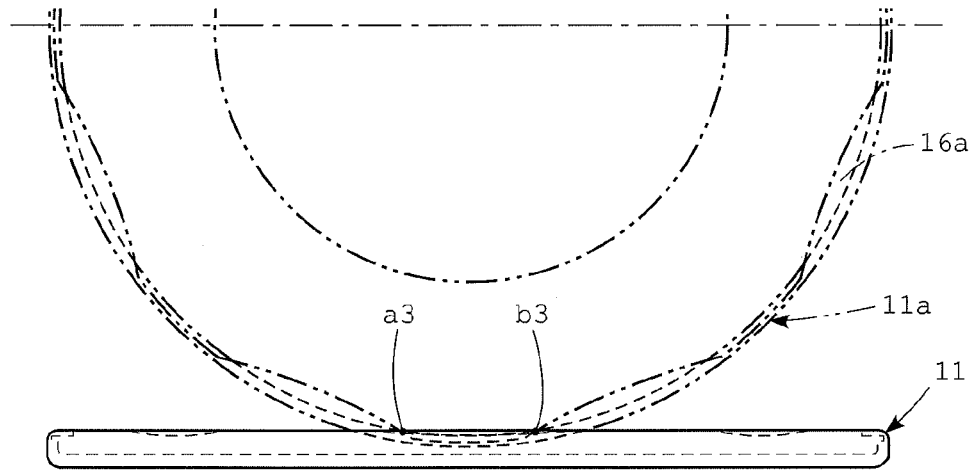
FIG. 13 is a partial front view of a portion in FIG. 11.

Now, assume that the hypothetical outer ring 11a was taken away from the rolling contact surface 20 of the outer ring 11 and the translation was continued (see illustration in alternate long and two short dashes lines in see FIG. 12 and FIG. 13), and assume further that two mutually adjacent engaging hooks 16a of the hypothetical outer ring 11a came to engagement with the engaging hook 16 of the outer ring 11 at points a3, b3, resulting in a marginal engagement state.

Although the relationship is h1>h2, there is now interference with the engaging hook 16; but as shown in FIG. 12, there is an axial gap φ between the engaging hook 16 and the flange 15a at the maximum protrusion (the midpoint of the engaging hook 16) of the engaging hook 16. Therefore, the outer ring 11 does not engage with the hypothetical outer ring 11a, so consequently, they do not catch each other.

Figure 14:
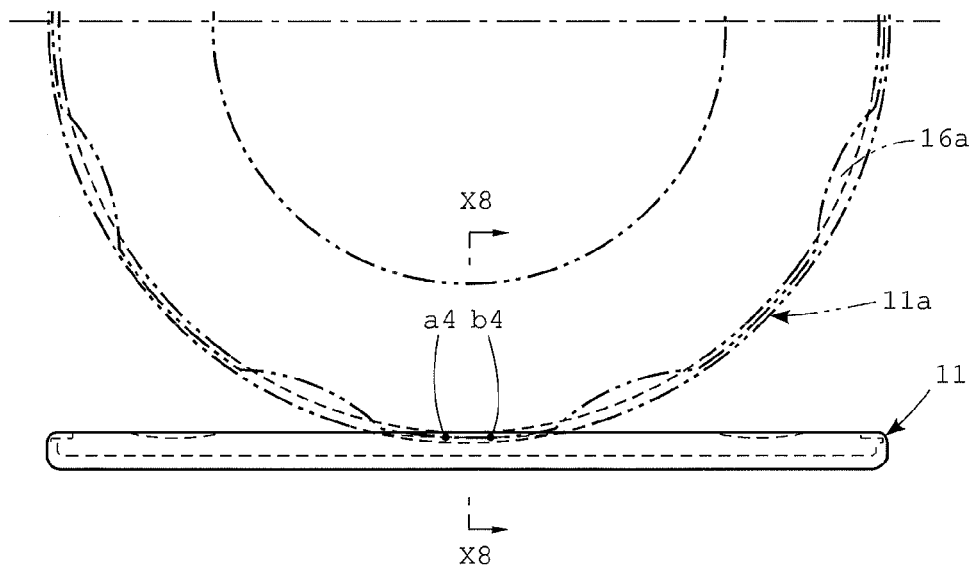
FIG. 14 is a partial front view for describing another example of how outer rings will catch each other.
Figure 15:
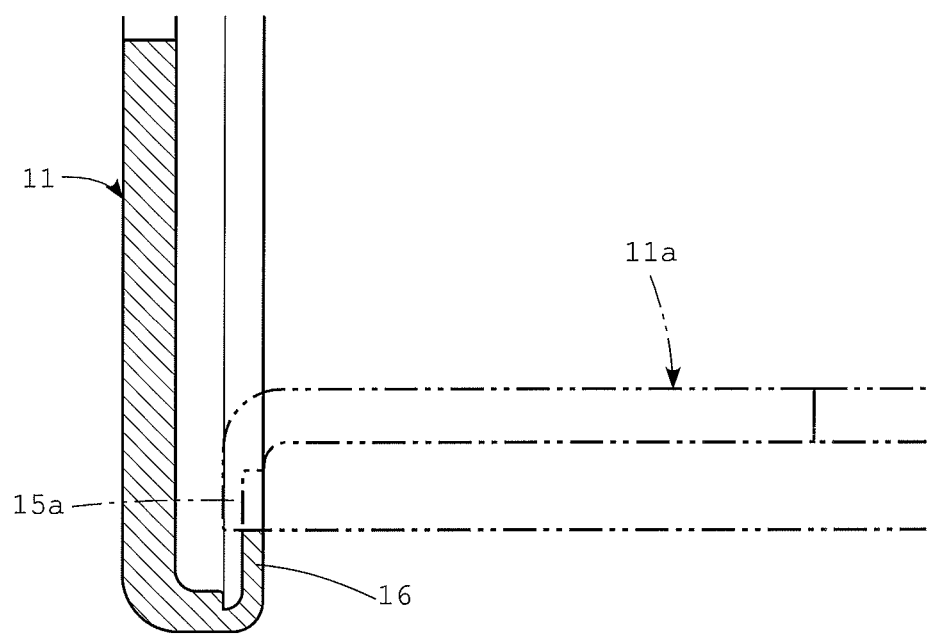
FIG. 15 is an enlarged sectional view of a portion taken in line X8-X8 in FIG. 14.

Further, if the translation is continued from the above-described marginal engagement state to a point where the gap φ becomes zero, to allow the engaging hook 16 to make contact on two points a4, b4, then the flange 15a can no longer get deep below the engaging hook 16 (see FIG. 14 and FIG. 15).

Hence, even under the state where h1>h2, flanges will not catch each other as far as there is an axial gap φ between the engaging hook 16 and the flange 15a under the marginal engagement state (hereinafter called second catch-free condition). In order to satisfy these conditions, it is desirable that the engaging hooks 16 are formed to have a smooth arc of a small curvature.

Figure 16:
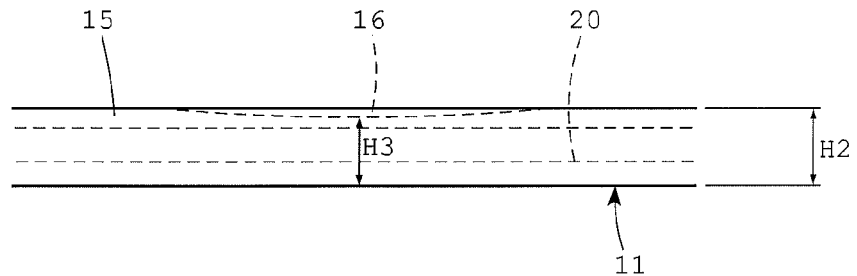
FIG. 16 is an arrow view taken in line X4-X4 in FIG. 3.
Figure 17:
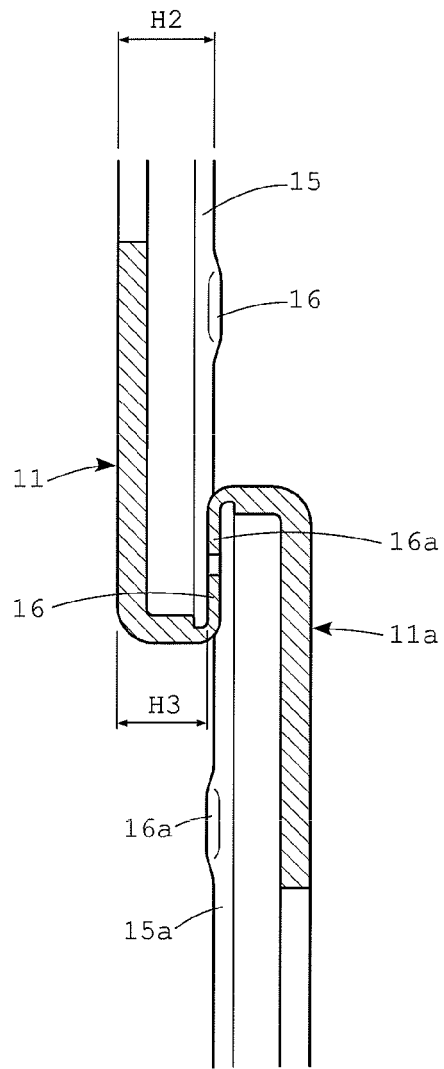
FIG. 17 is an enlarged partial sectional view showing a state that engaging hooks do not catch each other.

On the other hand, as shown in FIG. 16 and FIG. 17, the engaging hook 16 has an inside height H3 from the bottom surface of the outer ring 11, which is lower than a height H2 of the flange 15 from the bottom surface of the outer ring 11. Namely, the two heights are in the following relationship: H2>H3.

When there is this relationship, even if the engaging hook 16a of an outer ring 11a comes close to the engaging hook 16 of another outer ring 11, the two flanges 15, 15a make contact with each other, preventing the engaging hooks 16, 16a from getting in each other. Consequently, the engaging hooks 16, 16a are prevented from catching each other. The condition H2>H3 will be called third catch-free condition.

Figure 18:
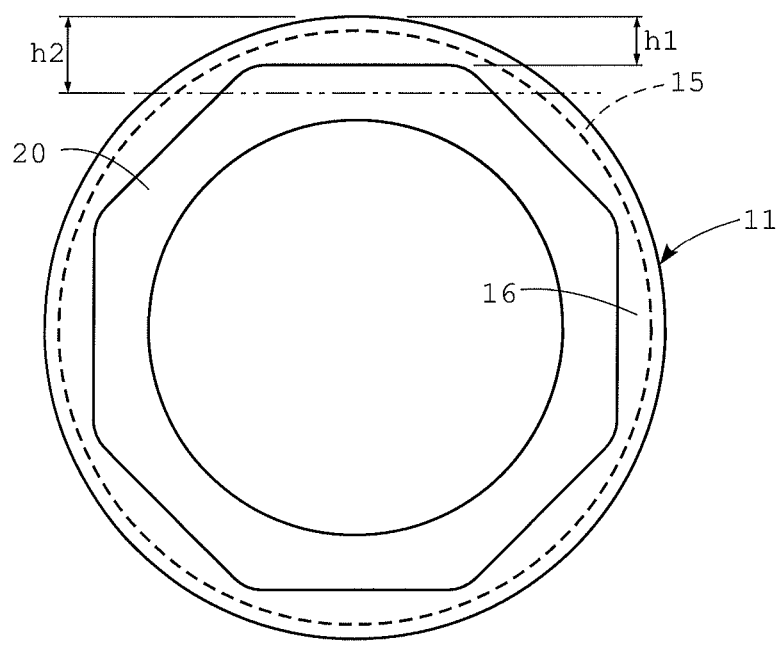
FIG. 18 is a plan view of another outer ring.
Figure 19:
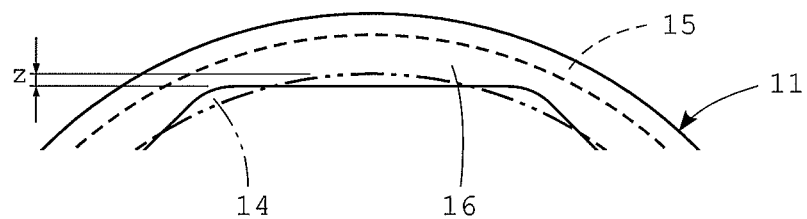
FIG. 19 is an enlarged plan view of a portion in FIG. 18.

Next, description will cover other shapes of the outer ring 11, especially different shapes of the engaging hook 16. FIG. 18 shows an example, where each engaging hook 16 has a straight inner side which is continuous from/to straight inner sides of the adjacent engaging hooks 16, making an octagonal shape as a whole. The distance W2 between two engaging hooks 16 defined earlier is zero. Since there is some protrusion at each apex, the engaging hook 16 has a relatively high rigidity. FIG. 19 shows part of this shape in an enlarged view. The figure shows that the inner side of the engaging hook 16 and the retainer 14 are in axial engagement with each other with an engaging margin z.

Figure 20:
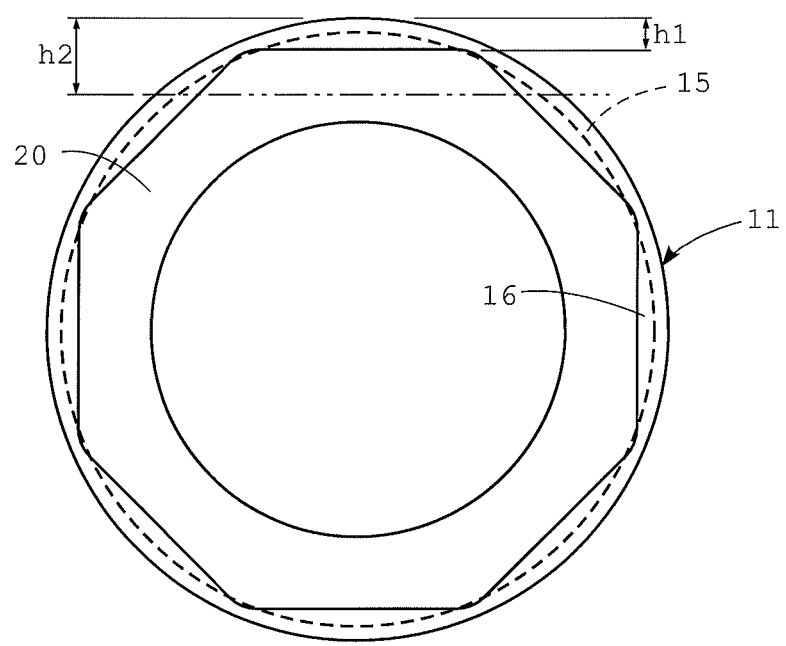
FIG. 20 is a plan view of another outer ring.

FIG. 20 shows a similar example to the above, in that inner sides of engaging hooks 16 make an octagon, differing however that the amount of protrusion at each apex is zero, resulting in lower rigidity than in the previous example. At each apex, part of the flange 15 is exposed though only slightly.

Figure 21:
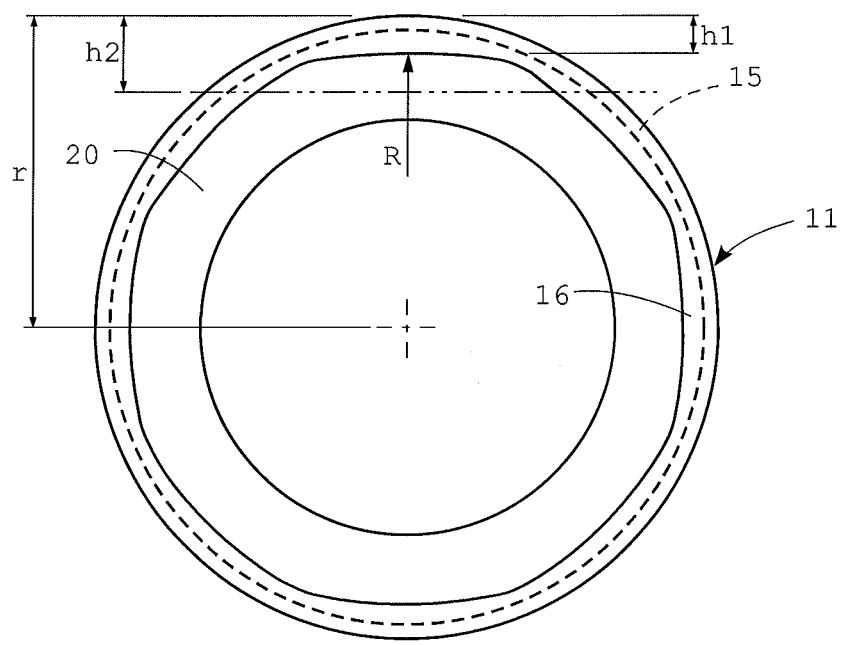
FIG. 21 is a plan view of another outer ring.

FIG. 21 shows an example, where the inner side in each engaging hook 16 in the example in FIG. 18 is receded in a direction to the outer circumferential direction to form a concaved arc line. In this case, a curvature R, a radius r of the outer ring 11, and the amount of protrusion h1 of the engaging hook 16 are in the following relationship: R>r−h1. A reason for this is if R were smaller than the right side of the above-mentioned relational equation, the amount of protrusion at and near each apex of the polygon would be larger, making is difficult to assemble the retainer 14 into the bearing.

In any of the cases described thus far, two outer rings 11 of the same construction will never catch each other as far as the first catch-free condition (h1≤h2) and the third catch-free condition (H2>H3) are satisfied. Also, in the engaging hooks 16 according to FIG. 18 and FIG. 21, the flange 15 is not exposed, and in the case according to FIG. 20, the exposure is only slightly. Therefore, there is no need, obviously, to apply the first catch-free condition since it is obvious that no two outer rings 11 of the same construction will catch each other.

Figure 22:
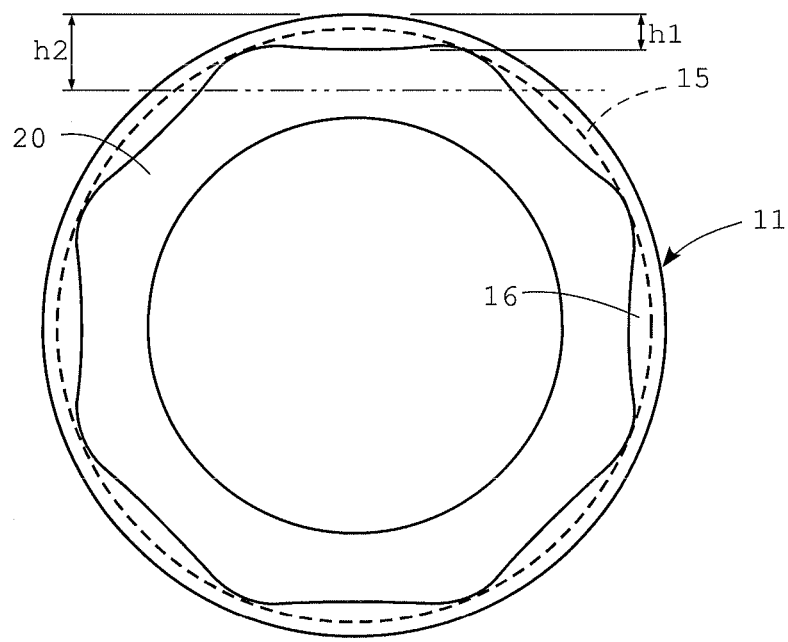
FIG. 22 is a plan view of another outer ring.

FIG. 22 shows an example, where the inner side of each engaging hook 16 is inward-bulging convex arc line, exposing the flange 15 over a relatively long distance between mutually adjacent two engaging hooks 16. In other words, the arrangement may allow mutual engagement since the engaging hooks 16 are intermittent; however, no two parts catch each other as far as the first catch-free condition is satisfied.

It should be noted here that all examples shown in FIG. 18 through FIG. 22 satisfy the third catch-free condition.

The thrust bearings described thus far may be used in automobile automatic transmissions, compressors, etc.

Embodiment 2

Figure 23:
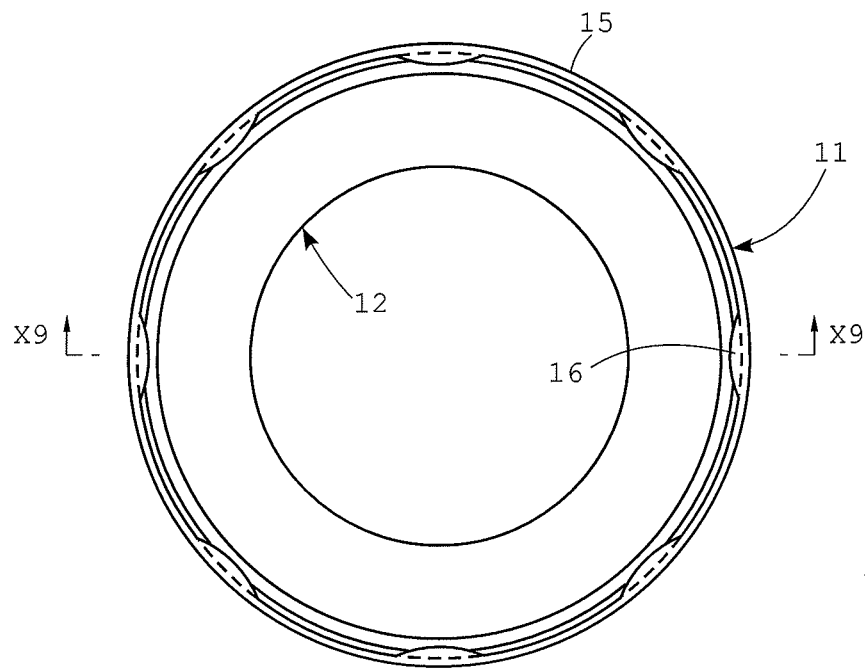
FIG. 23 is a plan view of a thrust bearing according to Embodiment 2.
Figure 24:
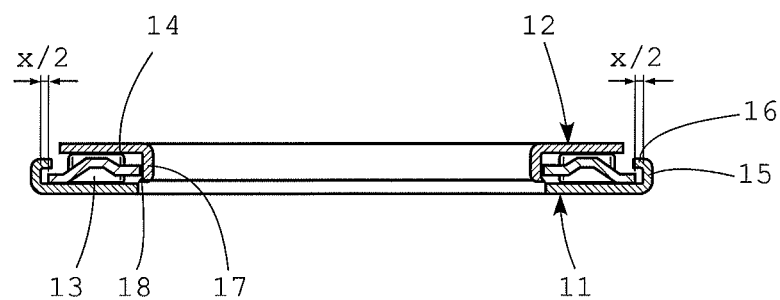
FIG. 24 is a sectional view taken in line X9-X9 in FIG. 23.

FIG. 23 and FIG. 24 show a thrust bearing according to Embodiment 2 which is applicable to those thrust bearing of a design that the bearing's internal gap between the retainer and the bearing rings in the radial direction is greater than two times the expected amount of eccentric rotation of the shaft, so that expected eccentric rotation of the shaft will not cause the retainer 14 to make contact with the bearing rings.

In the thrust bearing described above for application to bearing sections which are subject to relatively large amount of eccentricity, the engaging hooks must protrude by an amount greater than two times the amount of eccentricity but it is difficult to form such hooks by means of staking. However, they are formed by bending according to the present invention. Therefore, the present invention is particularly advantageous in this case. In this case, like in the present embodiment 2, there is provided a bearing internal gap x which is greater than two times the amount of eccentricity, between the retainer 14 and the flange 15 of the outer ring 11 so that eccentric rotation of the shaft will not cause contact with the flange 15. It should be appreciated that the figure shows a state where the bearing internal gap x is radially halved and distributed evenly on both sides for the sake of drawing convenience.

Embodiment 3

Figure 25:
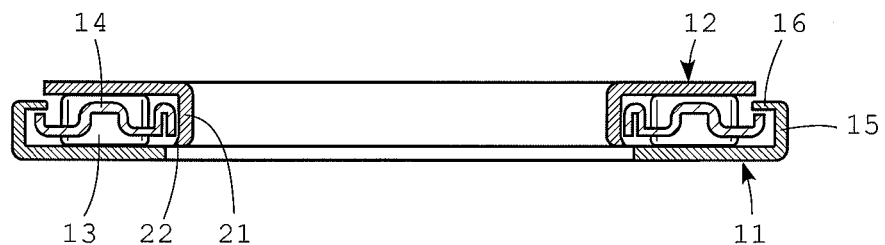
FIG. 25 is a sectional view of a thrust bearing according to Embodiment 3.
Figure 26:
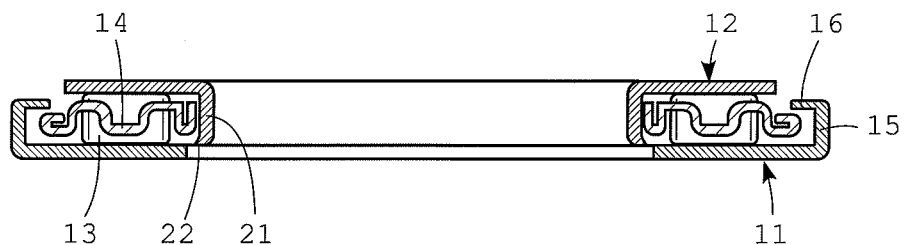
FIG. 26 is a sectional view of another thrust bearing according to Embodiment 3.

FIG. 25 and FIG. 26 show a thrust bearing according to Embodiment 2 which, like the thrust bearings according to Embodiment 1, the three components, i.e., an outer ring 11, an inner ring 12 and a retainer 14 are non-separatingly assembled with each other. A difference, however, is that the retainer 14 has a different shape in its section, from the one in Embodiment 1. The outer ring 11 has the same construction as those described thus far, and it does not catch others during the manufacturing process. The inner ring 12 has an inner-diameter flange 21, and the inner-diameter flange 21 has engaging hooks 22 for assembly with the retainer 14.

Embodiment 4

Figure 27:
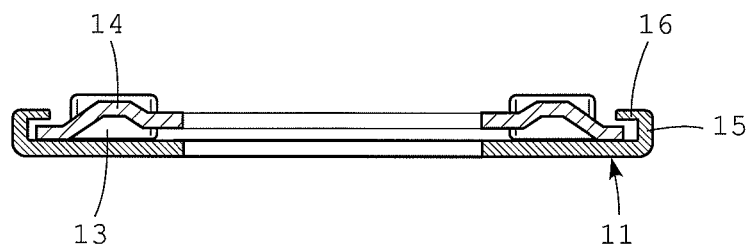
FIG. 27 is a sectional view of a thrust bearing according to Embodiment 4.
Figure 28:
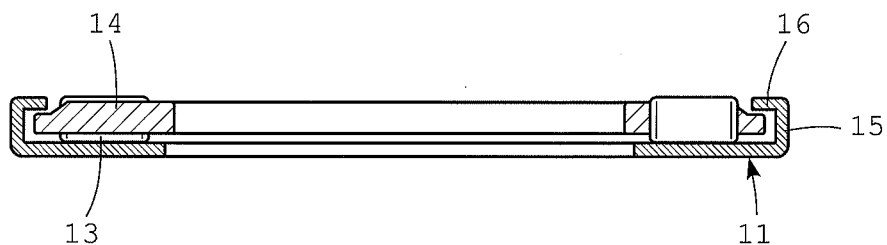
FIG. 28 is a sectional view of another thrust bearing according to Embodiment 4.
Figure 29:
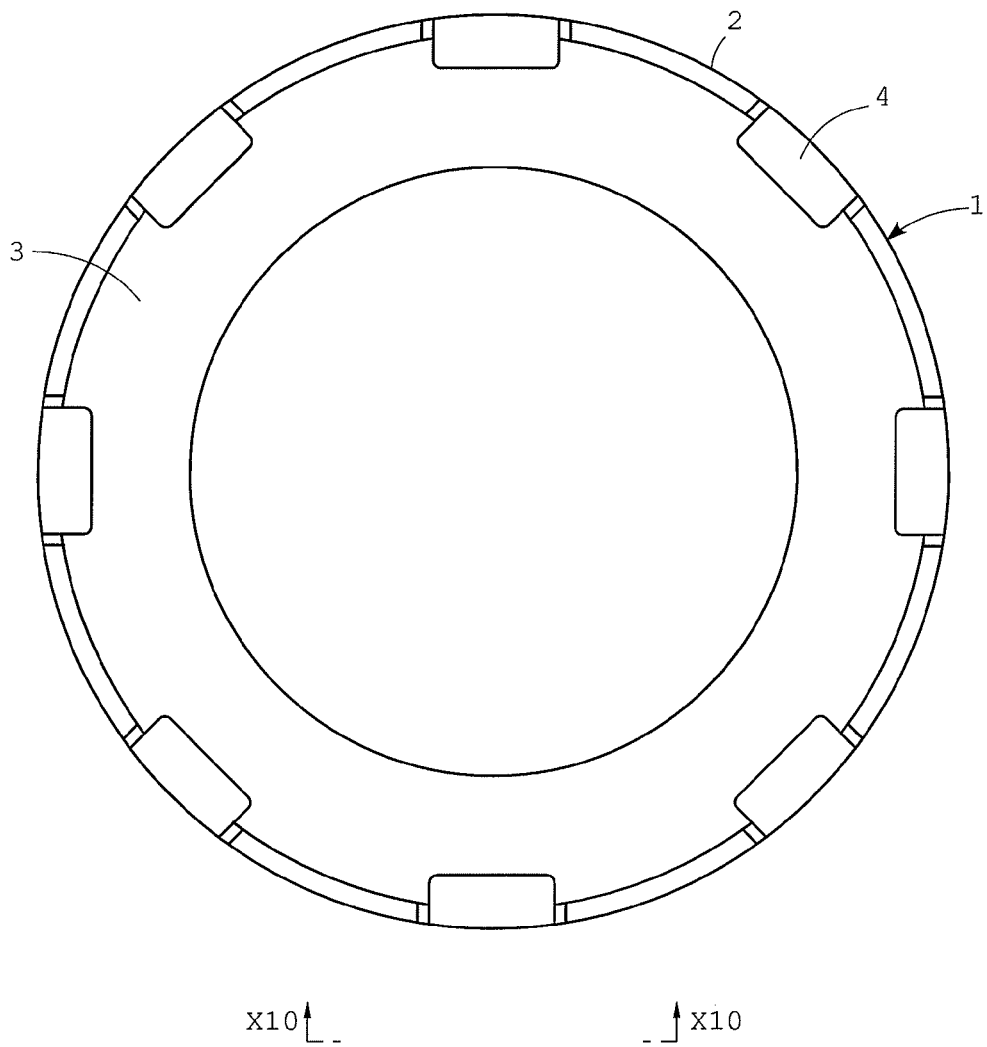
FIG. 29 is a plan view of a conventional outer ring.
Figure 30:
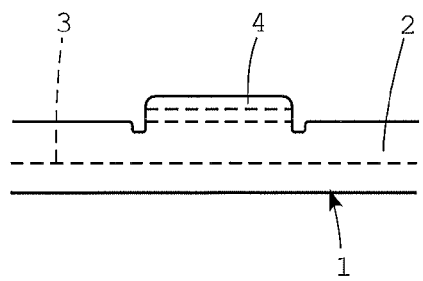
FIG. 30 is an arrow view taken in line X10-X10 in FIG. 29.
Figure 31:
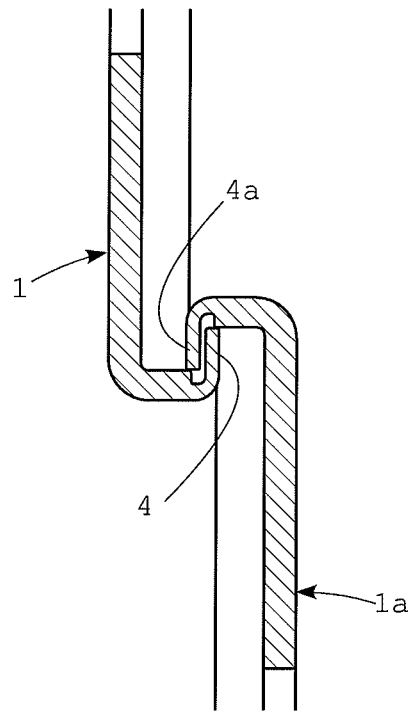
FIG. 31 is an enlarged sectional view showing how engaging hooks catch each other.
Figure 32:
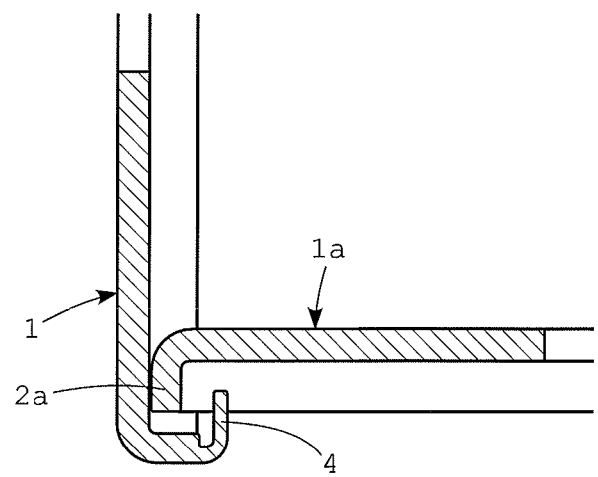
FIG. 32 is an enlarged sectional view showing how an engaging hook catches a flange.

FIG. 27 and FIG. 28 show thrust bearings according to Embodiment 3, which includes an outer ring 11, and a retainer 14 that holds rollers 13. Engaging hooks 16 formed in the outer ring 11 fastens the retainer 14 with the outer ring so that the two are non-separatingly assembled with each other. In this case, again, the outer ring 11 has the same construction as those described thus far, and it does not catch others during the manufacturing process.

REFERENCE SIGNS LIST 11, 11a outer ring
12 inner ring
13 roller
14 retainer
15, 15a flange
16, 16a engaging hook
18 step
19 tip edge region
20 rolling contact surface
21 inner-diameter flange
22 engaging hook

The invention claimed is:

1. Outer rings of thrust bearings, a first of said outer rings comprising:
    an outer diameter edge formed with a flange, the flange having an axial height and a tip edge; and
    engaging hooks protruding radially inward from the tip edge of the flange and each having a radial height;
    said first of said outer rings being adapted to enter into a marginal engagement state with an identical second of said outer rings in which said first of said outer rings and said identical second of said outer rings do not catch each other;
    wherein each engaging hook of said first of said outer rings has a radially inner side which is continuous with the radially inner sides of the adjacent engaging hooks, so that the radially inner sides of the engaging hooks form a polygon, and
    wherein, in the marginal engagement state;
        said identical second of said outer rings is in parallel to a base line of said first of said outer rings; and
        an amount of protrusion h1 of one of the engaging hooks of said first of said outer rings from the base line of said first of said outer rings is smaller than or equal to a height h2 of a tip of a flange of said identical second of said outer rings from the base line of said first of said outer rings or an axial gap is defined between any of the engaging hooks in said first of said outer rings and the flange of said identical second of said outer rings.

2. The outer rings according to claim 1, wherein the flange of said first of said outer rings has an axial height H2 greater than an inside axial height H3 of at least one of said engaging hooks of first of said outer rings.

3. The outer rings according to claim 1, wherein at least one of said engaging hooks of said first of said outer rings has a length W1 in a circumferential direction whereas two mutually adjacent engaging hooks of said first of said outer rings are separated in the circumferential direction by a length W2, and the two lengths are in a relationship expressed as W1>W2.

4. The outer rings according to claim 1, wherein said engaging hooks of said first of said outer rings are formed intermittently in a circumferential direction.

5. The outer rings according to claim 4, wherein the radially inner side in each engaging hook is receded to form a concaved arc line, with a curvature R of the concaved arc, a radius r of said first of said outer rings, and the amount of protrusion h1 being in a relationship expressed as R>r−h1.

6. Trust bearings comprising said outer rings according to claim 1, respectively, wherein:
a first of the thrust bearings comprises:
said first of said outer rings,
an inner ring, and
a retainer holding a predetermined number of rollers,
wherein the retainer is placed between said first of said outer rings and the inner ring, and
wherein the inner ring has an inner circumferential edge formed with a flange provided with engaging hooks for the retainer for non-separating assembly of said first of said outer rings, the retainer and the inner ring.

7. Thrust bearings comprising said outer rings according to claim 1, respectively, wherein:
a first of the thrust bearings comprises:
said first of said outer rings, and
a retainer holding a predetermined number of rollers,
wherein the engaging hooks of said first of said outer rings fasten said first of said outer rings and the retainer to each other in a non-separating manner, and the retainer and the flange of the said first of said outer rings are spaced from each other by a radial internal gap, the engaging hooks being formed by being bent to extend inward beyond the radial internal gap.

8. Outer rings of thrust bearings, a first of said outer rings comprising:
an outer diameter edge formed with a flange, the flange having an axial height and a tip edge; and
engaging hooks protruding radially inward from the tip edge of the flange and each having a radial height;
said first of said outer rings being adapted to enter into a marginal engagement state with an identical second of said outer rings in which said first of said outer rings and said identical second of said outer rings do not catch each other;
wherein said engaging hooks of said first of said outer rings are formed intermittently in a circumferential direction,
wherein, in the marginal engagement state;
said identical second of said outer rings is in parallel to a base line of said first of said outer rings; and
an amount of protrusion h1 of one of the engaging hooks of said first of said outer rings from the base line of said first of said outer rings is smaller than or equal to a height h2 of a tip of a flange of said identical second of said outer rings from the base line of said first of said outer rings or an axial gap is defined between any of the engaging hooks in said first of said outer rings and the flange of said identical second of said outer rings, and
wherein each engaging hook of said first of said outer rings has a radially inner side, and the inner side in each engaging hook is receded to form a concaved arc line, with a curvature R of the concaved arc, a radius r of said first of said outer rings, and the amount of protrusion h1 being in a relationship expressed as R>r−h1.

9. The outer rings according to claim 8, wherein the flange of said first of said outer rings has an axial height H2 greater than an inside axial height H3 of at least one of said engaging hooks of said first of said outer rings.

10. The outer rings according to claim 8, wherein at least one of said engaging hooks of said first of said outer rings has a length W1 in the circumferential direction whereas two mutually adjacent engaging hooks of said first of said outer rings are separated in the circumferential direction by a length W2, and the two lengths are in a relationship expressed as W1>W2.

11. Thrust bearings comprising said outer rings according to claim 8, respectively, wherein:
a first of the thrust bearings comprises:
said first of said outer rings,
an inner ring, and
a retainer holding a predetermined number of rollers,
wherein the retainer is placed between said first of said outer rings and the inner ring, and
wherein the inner ring has an inner circumferential edge formed with a flange provided with engaging hooks for the retainer for non-separating assembly of said first of said outer rings, the retainer and the inner ring.

12. Thrust bearings comprising said outer rings according to claim 8, respectively, wherein:
a first of the thrust bearings comprises:
said first of said outer rings, and
a retainer holding a predetermined number of rollers,
wherein the engaging hooks of said first of said outer rings fasten said first of said outer rings and the retainer to each other in a non-separating manner, and the retainer and the flange of said first of said outer rings are spaced from each other by a radial internal gap, the engaging hooks being formed by being bent to extend inward beyond the radial internal gap.

\* \* \* \* \*